United States Patent [19]

Funk

[11] Patent Number: 5,959,583
[45] Date of Patent: Sep. 28, 1999

[54] ANTENNA ADAPTER

[75] Inventor: Thomas J. Funk, Boulder, Colo.

[73] Assignee: Qualcomm Incorporated, San Diego, Calif.

[21] Appl. No.: 08/873,286

[22] Filed: Jun. 11, 1997

Related U.S. Application Data

[63] Continuation of application No. 08/579,170, Dec. 27, 1995, abandoned.

[51] Int. Cl.$^6$ .................................................. H01Q 1/24
[52] U.S. Cl. .......................... 343/702; 343/906; 455/575; 455/351
[58] Field of Search .................................... 343/702, 906; 455/129, 351, 115, 226.1, 89, 67.1, 575; H01Q 1/24

[56] References Cited

U.S. PATENT DOCUMENTS

| | | | |
|---|---|---|---|
| 4,031,468 | 6/1977 | Ziebell et al. | 343/702 |
| 4,286,335 | 8/1981 | Eichler et al. | 343/702 |
| 5,158,483 | 10/1992 | Fishman et al. | 439/668 |
| 5,357,262 | 10/1994 | Blaese | 343/906 |
| 5,524,284 | 6/1996 | Marcou et al. | 343/702 |

FOREIGN PATENT DOCUMENTS

| | | | |
|---|---|---|---|
| 0331435 | 9/1989 | European Pat. Off. | H04B 1/38 |
| 0412852 | 2/1991 | European Pat. Off. | H04B 1/38 |

*Primary Examiner*—Michael C. Wimer
*Attorney, Agent, or Firm*—Russell B. Miller; Charles D. Brown

[57] ABSTRACT

A novel and improved antenna adapter for interfacing a portable radiotelephone 200 with test equipment is disclosed. In a preferred embodiment, the adapter assembly comprises an RF connector 104 at one end of an elongated conductor 102 which connects directly to the radiotelephone's 200 antenna port, replacing the normal antenna assembly. The elongated conductor 102 makes electrical contact with an external ground 204 of the battery charging ports at the bottom of the radiotelephone 200 at another end. The RF connector 104 may be impedance-matched to minimize RF signal attenuation when connected to the RF test equipment. In an exemplary embodiment, the RF connector 104 comprises a 50Ω impedance-matched SMA connector.

10 Claims, 4 Drawing Sheets

FIG. 1A
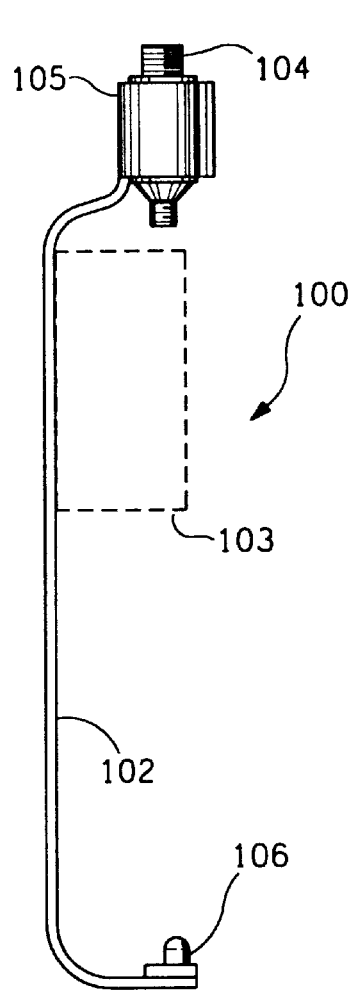
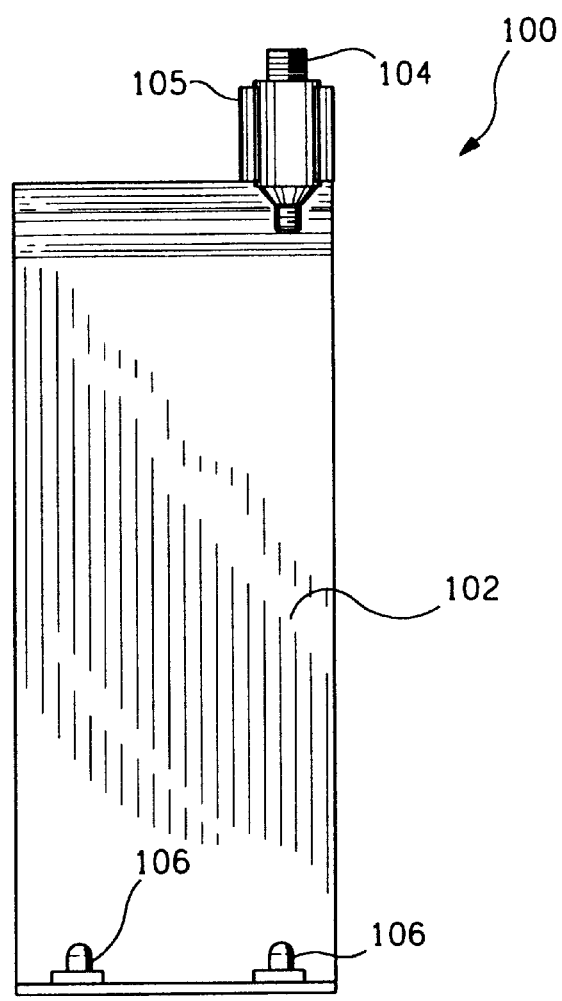
FIG. 1B

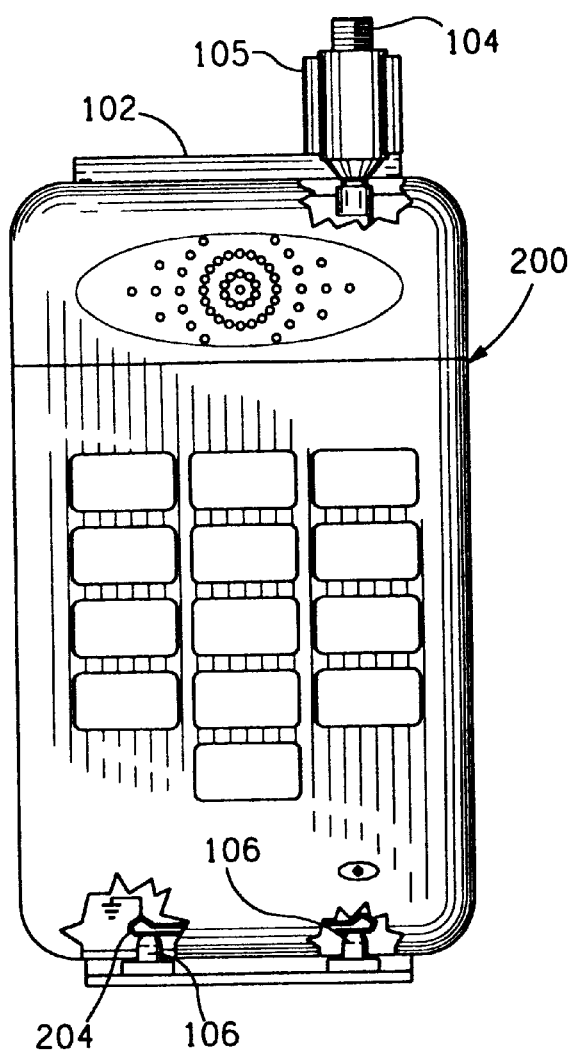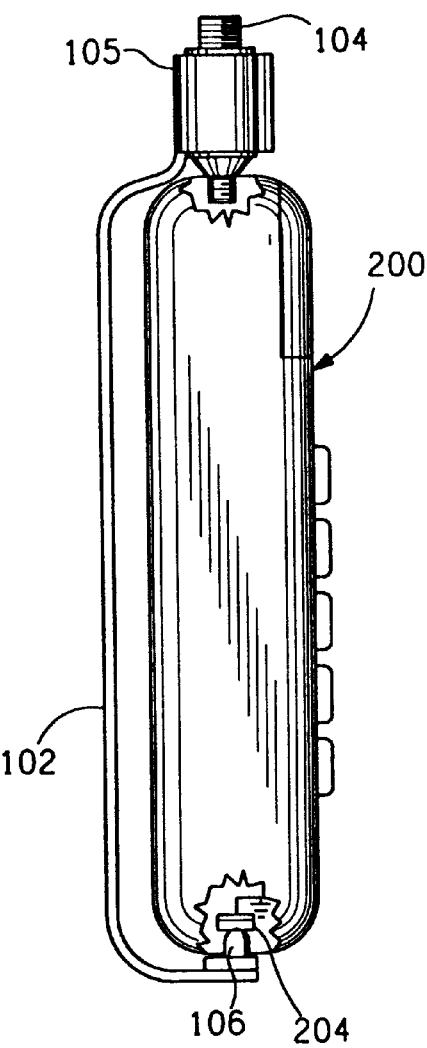
FIG. 2B
FIG. 2A

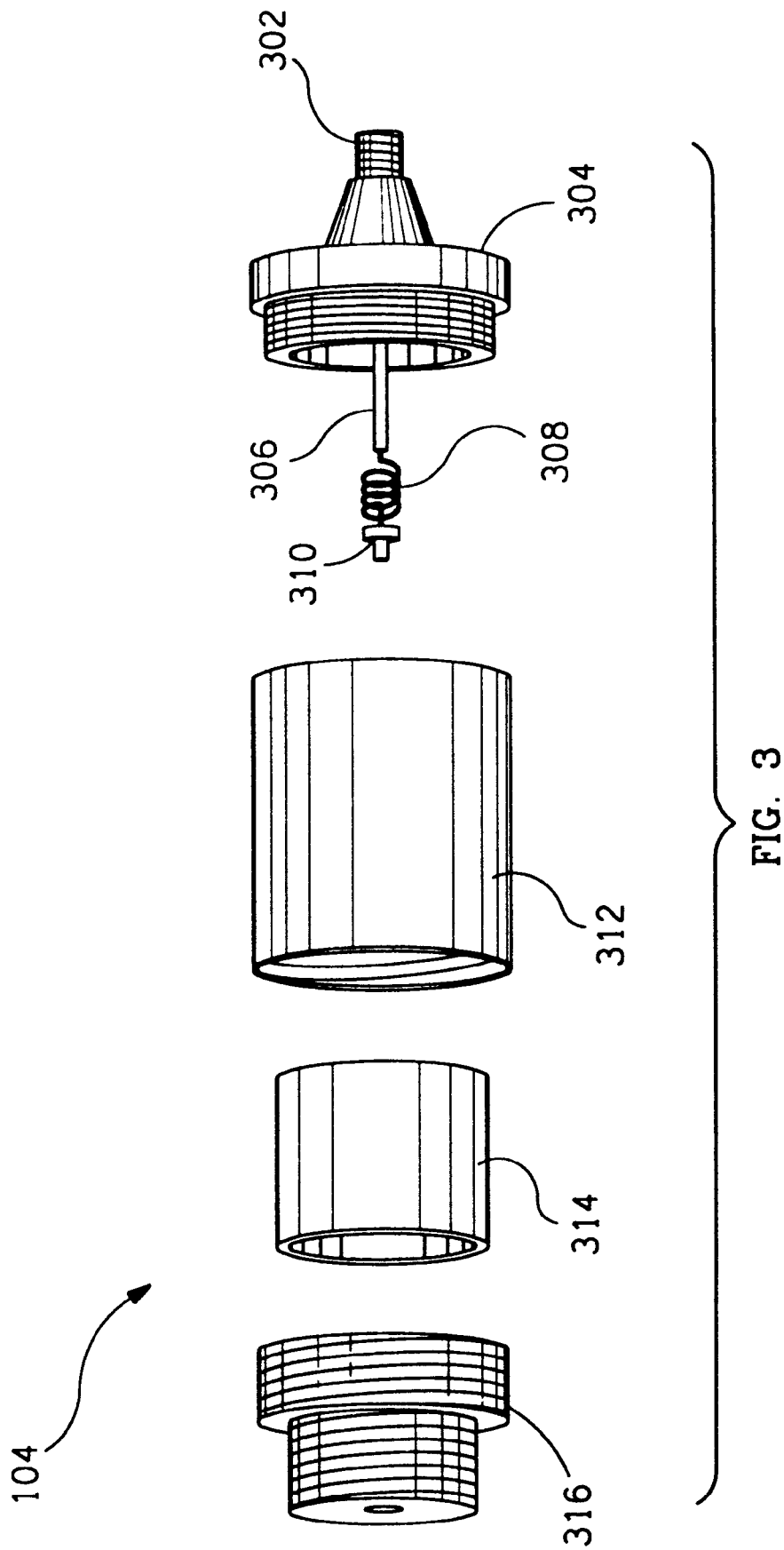

ANTENNA ADAPTER

This application is a continuation of application Ser. No. 08/579,170 filed Dec. 27, 1995 now abandoned.

BACKGROUND OF THE INVENTION

1. Field of the Invention

The present invention relates to radio-frequency (RF) test equipment for portable radiotelephones. More particularly, the present invention relates to a novel and improved adapter for interfacing a portable radiotelephone with RF test equipment.

II. Description of the Related Art

In the field of cellular communications, portable radiotelephones are used to communicate with base stations over radio-frequencies (RF). As these portable radiotelephones are manufactured, they are typically tested at various stages of production. For example, the individual circuit card assemblies of the radiotelephone are typically tested for functionality and component integrity individually at the "card-level," and in combination at the "subassembly-level," as the portable radiotelephone is assembled. This production typically occurs in a factory setting, where much of the testing is automated, and the circuit cards which will eventually be enclosed in the radiotelephone housing may be substantially exposed. With the radiotelephone circuit cards substantially exposed, access to various test points on the circuit cards is conveniently accommodated. However, once the portable radiotelephone is fully assembled, the circuit cards and other components are typically fully enclosed in the radiotelephone housing, preventing convenient access to the internal portions of the radiotelephone.

It is often desirable to test the RF performance of the radiotelephone under controlled conditions after it is fully assembled, both alone and in conjunction with an associated base station. Additionally, it is often desirable to test the performance of the associated base station itself by interfacing the RF signal of one or more portable radiotelephones directly to the base station. Typically, once the radiotelephone is fully assembled the only access to the RF signal generated by the radiotelephone is at the antenna port. However, there is typically no RF return path available at the antenna port itself because the antenna is normally a simple dipole. Without convenient access to the internal portions of the radiotelephone, it becomes very difficult to interface the radiotelephone to any desired RF test equipment without "jury-rigging" awkward and cumbersome test setups. For example, one solution to the problem would be to create a "virtual ground" by using a large piece of double-sided circuit board to serve as an RF return path. In such a setup, the antenna port could be connected to the top side of the circuit board, with the bottom side serving as the virtual ground. However, such a test setup is impractical due to its large and awkward size, its inability to be calibrated for predictability in testing, high RF signal leakage, and unacceptable RF signal attenuation across the circuit board.

What is needed is an assembly for interfacing a fully-assembled portable radiotelephone with RF test equipment which is small in size, rugged in construction, and easy to use. Such an RF test equipment interface assembly must provide an RF return path which exhibits low RF signal attenuation, i.e. insertion loss, as well as low radiated emission levels.

SUMMARY OF THE INVENTION

The present invention is a novel and improved antenna adapter for testing the RF signal performance of a portable radiotelephone. In a preferred embodiment, the adapter assembly comprises an RF connector at one end of an elongated conductor which connects directly to the antenna port, replacing the antenna assembly. The elongated conductor makes electrical contact with the external charging ports at the bottom of a radiotelephone at another end. The RF connector may be impedance-matched to minimize RF signal attenuation when connected to the RF test equipment. In an exemplary embodiment, the RF connector comprises a 50Ω impedance-matched SMA connector.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 1A is a side view of the antenna adapter of the present invention;

FIG. 1B is a front view of the antenna adapter of the present invention;

FIG. 2A is a partially broken away front view of a portable radiotelephone employing the antenna adapter of the present invention;

FIG. 2B is a partially broken away side view of a portable radiotelephone employing the antenna adapter of the present invention;

FIG. 3 is a partially disassembled side view of an exemplary embodiment of an RF connector of the present invention.

DETAILED DESCRIPTION OF THE PREFERRED EMBODIMENTS

Figure 4:
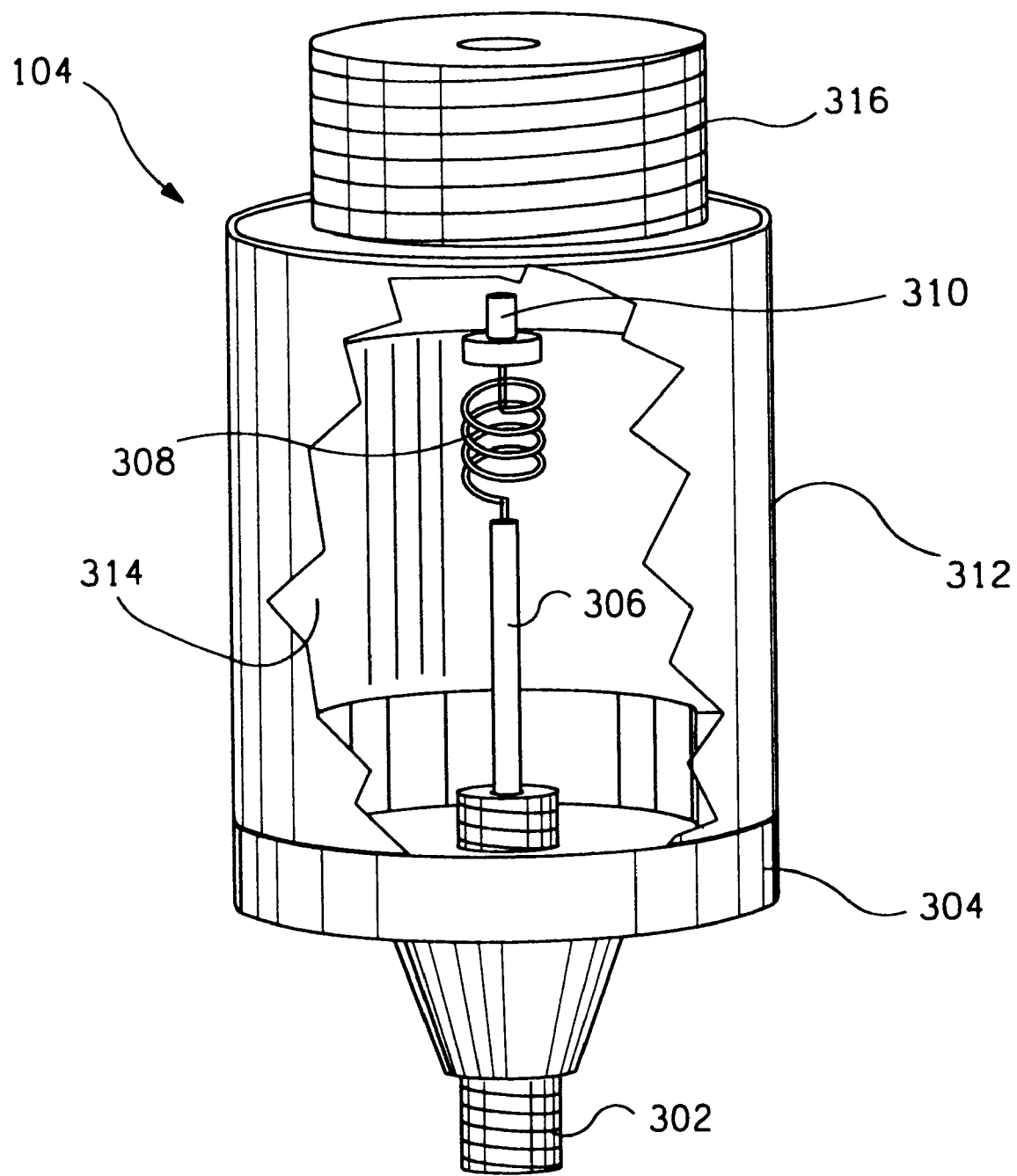
FIG. 4 is a partially broken away side view of an exemplary embodiment of the assembled RF connector of the present invention.

A portable radiotelephone capable for use with the present invention employs an external antenna at a top end, for transmitting RF signals, and an electrical connector or plate contact at a bottom end, for interfacing with a portable radiotelephone battery charging device. FIG. 1A illustrates a side view of the antenna adapter 100 of the present invention. The antenna adapter 100 comprises an elongated member 102 which is electrically conductive. In alternate embodiments, elongated member 102 may be a frame structure made entirely of a conductive material such as metal, or it may be made substantially out of a non-conductive material such as composite plastic, and coated with a conductive material. Also, elongated member 102 may configured as a frame with side members 103 for receiving and "cradling" the portable radiotelephone. Alternatively, elongated member 102 may be simply a wire, although improved RF performance and ruggedness may be accomplished with the frame structure configuration.

At a first end of elongated member 102 is a connector 104. In a preferred embodiment, connector 104 is a 50Ω impedance-matched SMA RF connector. However, it is understood that many different connector types standard in the art may be used at the first end of elongated member 102 to accomplish substantially the same result, i.e. connecting the antenna port of the radiotelephone under test directly to the desired RF test equipment, depending on the type of test equipment to be interfaced with the portable radiotelephone. In a preferred embodiment, connector 104 is coupled to elongated member 102 by means of a connector clip 105.

Connector clip 105 is fixedly attached to elongated member 102, and may be an integral part thereof. Connector clip 105 captures connector 104 such that connector 104 is free to rotate about a longitudinal axis so that it may be easily mated to the antenna port of the portable radiotelephone as will be shown in FIGS. 2A and 2B. It is understood that other means of coupling connector 104 to elongated member 102 may be used without the use of inventive faculty.

At a second end of elongated member 102 is an electrical contact 106. In a preferred embodiment, electrical contact 106 comprises at least one electrically conductive pin, capable of making reliable electrical contact with the external battery-charging contacts of a portable radiotelephone which utilizes plate contacts to interface with a battery charging assembly (not shown). However, it is understood that many different types of electrical contacts or connectors standard in the art may be used at the second end of elongated member 102 to accomplish substantially the same result, i.e. providing a RF return path to a ground plane of the radiotelephone under test, depending on the construction and design of the particular radiotelephone under test.

A front view of the antenna adapter of the present invention is illustrated in FIG. 1B. As can be seen from FIG. 1B, electrical contact 106 may comprise two pins. In a preferred embodiment, only one of the two pins is electrically conductive. Such an arrangement would be used where the battery charging ports of the portable radiotelephone comprise two conductive plates, one for power and one for ground. In such a case, the electrically conductive pin of electrical contact 106 would make contact with the ground plate of the battery charging port, whereas the non-electrically conductive pin of electrical contact 106 would make contact with the power plate of the battery charging port. In this arrangement, the non-electrically conductive pin would serve as a means of guiding electrical contact 106 into proper alignment with the radiotelephone, providing further ruggedness. Additionally, one can see from FIG. 1B that elongated member 102 may be configured as a frame for receiving the portable radiotelephone, and shaped to conform to the approximate size and shape of a typical portable radiotelephone.

FIG. 2A illustrates a partially broken away front view of a portable radiotelephone 200 employing the antenna adapter 100 of the present invention. FIG. 2B illustrates a partially broken away side view of the same radiotelephone 200 of FIG. 2A. As can be seen from FIGS. 2A and 2B, connector 104 at a first end of elongated member 102 connects directly to the antenna port at the top end of radiotelephone 200. Also, electrical contact 106 at an opposite end of elongated member 102 makes electrical contact with an exposed ground pad 204 on the battery charging port at the bottom end of radiotelephone 200. When antenna adapter 100 is connected to radiotelephone 200 as illustrated in FIGS. 2A and 2B, antenna adapter 100 and radiotelephone 200 form a single, rugged assembly. It is understood that additional means of providing secure attachment of antenna adapter 100 to radiotelephone 200 may be added without requiring any further inventive faculty.

RF signals generated by radiotelephone 200 are provided to the antenna port to connector 104. Connector 104 may be connected via various cables (not shown) that are standard in the art to the desired RF test equipment (not shown). An RF return path is provided through connector 104 and elongated member 102 to electrical contact 106. Electrical contact 106 makes electrical contact with an exposed ground pad on the battery charging port at the bottom end of radiotelephone 200 to provide the ground necessary for proper RF signal measurement.

As can be seen from FIG. 2A, elongated member 102 may be shaped to conform in width to the physical dimensions of radiotelephone 200. Also, as can be seen from FIG. 2B, elongated member 102 may be fashioned as relatively slim in thickness, and conform to the curvature of the physical outline of radiotelephone 200, effectively capturing radiotelephone 200 between connector 104 and electrical contact 106. In this way, antenna adapter 100 is seen to be a non-intrusive means of providing the necessary RF return path, while allowing a user to cradle radiotelephone 200 in the palm of the user's hand. All buttons, speakers, and microphones on the front face of radiotelephone 200 remain accessible, allowing the user to perform a full range of RF functionality testing of radiotelephone 200 while still holding radiotelephone 200 in a natural position.

FIG. 3 illustrates a partially disassembled side view of an exemplary connector 104 of a preferred embodiment of the present invention. In this exemplary embodiment, connector 104 is a female SMA coaxial connector. A threaded metal lug 302 is bonded inside plastic insulator 304. Threaded metal lug 302 screws into the radiotelephone's 200 antenna port in place of the radiotelephone's 200 normal dipole antenna. The attachment means of lug 302 may be adapted as necessary to interface with the radiotelephone's 200 antenna port, for which various means are known in the art. A center pin 306 is soldered at one end to metal lug 302 and at the other end to inductor 308. Lug 302 and center pin 306 are axially mounted within plastic insulator 304 and extend therefrom. The value of inductor 308 is determined according to the impedance of the antenna match circuit internal to radiotelephone 200. In an exemplary embodiment, inductor 308 is 18 nanohenries. Contact pin 310 is soldered to inductor 308 and makes contact with the center pin on a male SMA connector (not shown) when the male SMA connector is mated to connector 104.

Outer cylinder housing 312 is electrically coupled to elongated member 102 by connector clip 105 (see FIGS. 1A–2B), and captured by connector clip 105 such that connector 104 is free to rotate about its longitudinal axis. Outer cylinder housing 312 is internally threaded, which threads mate with the external threads of plastic insulator 304. As can be seen from the partially broken-away view of connector 104 shown in FIG. 4, outer cylinder housing 312 surrounds and encloses internal cylinder 314 which acts as an RF shield around contact pin 310, inductor 308, and center pin 306. Internal cylinder 314 also serves as a parasitic capacitance, which, in conjunction with inductor 308 provides the desired impedance match. The amount of parasitic capacitance provided by internal cylinder 314 is small. Excessive parasitic capacitance in internal cylinder 314 would cause an undesirable impedance mismatch between the antenna and the desired test equipment. SMA female receptacle 316 is externally threaded at a captured end to mate with the internal threads of outer cylinder housing 312, capturing internal cylinder 314 between SMA female receptacle 316 and plastic insulator 304. SMA female receptacle 316 is externally threaded at an exposed end to mate with a male coaxial connector (not shown) of the desired RF test equipment. Contact pin 310 provides the desired RF signal from radiotelephone 200 to the desired test equipment.

Connector 104 is mounted on elongated member 102 such that the required RF return path to the charging ground on radiotelephone 200 is made. When threaded metal lug 302 is mated into antenna port 202, it forms a rugged and durable connection between antenna adapter 100 and radiotelephone 200, providing an unintrusive means of interfacing radiotelephone 200 with any desired RF test equipment. In the connected position, antenna adapter 100 provides insertion losses of less than 1 dB, and greatly reduces radiated RF leakage over other designs.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. An apparatus for interfacing a radiotelephone with test equipment, the radiotelephone having an antenna port and an internal ground plane accessible via an external ground port spaced apart from the antenna port, comprising:

an electrically conductive elongated member having a first end and a second end;

a connector, coupled to said elongated member at said first end, for electrically connecting the antenna port of the radio telephone to the test equipment; and an electrical contact assembly, coupled to said elongated member at said second end, for contacting the external ground port of the radiotelephone to provide a return path from the ground plane of the radiotelephone to the test equipment.

2. The apparatus of claim 1 further comprising a connector clip, coupled to said elongated member at said first end, for capturing said connector such that said connector is rotatable about a longitudinal axis.

3. The apparatus of claim 1 wherein said electrical contact assembly comprises at least one electrically conductive pin and at least one non-electrically conductive pin.

4. The apparatus of claim 1 wherein said connector is an impedance-matched coaxial connector.

5. The apparatus of claim 3 wherein said connector is an impedance-matched coaxial connector.

6. The apparatus of claim 4 wherein said coaxial connector comprises:

a threaded metal lug for inserting within said antenna port and conducting a signal generated by said radiotelephone;

a plastic insulator, connected to said threaded metal lug, for electrically isolating said coaxial connector;

a contact pin, coupled to said threaded metal lug, for conducting a signal generated by said radiotelephone;

a metal housing, coupled to said elongated member and substantially surrounding said contact pin, said metal housing for electrically shielding said contact pin; and a threaded receptacle, disposed within said metal housing, for receiving a mating connector.

7. An apparatus for connecting a radiotelephone with an external apparatus, the radiotelephone having a removable antenna coupled to an antenna port and an internal ground plane accessible via an external ground port spaced apart from the antenna port, comprising:

an electrically conductive elongated member having first and second ends defining a ground return path;

a connector, coupled to said elongated member at said first end, for electrically connecting the antenna port to the external apparatus when the removable antenna is removed; and an electrical contact assembly, coupled to said elongated member at said second end, for contacting the external ground port of the radiotelephone to provide a return path from the ground plane of the radiotelephone to the external apparatus.

8. The apparatus of claim 7 further comprising a connector clip, coupled to said elongated member at said first end, for capturing said connector such that said connector is rotatable about a longitudinal axis.

9. The apparatus of claim 8 further comprising electrical matching circuitry within said connector to match a predetermined impedance.

10. The apparatus of claim 9 wherein said predetermined impedance is fifty ohms.

* * * * *